United States Patent
Meredith et al.

(10) Patent No.: US 10,652,159 B2
(45) Date of Patent: May 12, 2020

(54) MOBILE PACKET DATA RATE CONTROL BASED ON RADIO LOAD AND OTHER MEASURES

(71) Applicant: AT&T Intellectual Property I, L.P., Atlanta, GA (US)

(72) Inventors: Sheldon Meredith, Roswell, GA (US); William Cottrill, Canton, GA (US); Mohamad Hannaoui, Concord, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 86 days.

(21) Appl. No.: 16/107,147

(22) Filed: Aug. 21, 2018

(65) Prior Publication Data
US 2020/0067845 A1    Feb. 27, 2020

(51) Int. Cl.
*H04L 12/825* (2013.01)
*H04W 28/02* (2009.01)

(52) U.S. Cl.
CPC ......... *H04L 47/25* (2013.01); *H04W 28/0289* (2013.01)

(58) Field of Classification Search
CPC .......................... H04L 47/25; H04W 28/0289
See application file for complete search history.

(56) References Cited

U.S. PATENT DOCUMENTS

| | | | |
|---|---|---|---|
| 7,519,030 B2 * | 4/2009 | Cimini, Jr. | H04L 47/10 370/338 |
| 8,121,085 B1 * | 2/2012 | Lee | H04W 72/0446 370/208 |
| 8,417,254 B2 | 4/2013 | Shu et al. | |
| 8,687,510 B1 * | 4/2014 | Shirali | H04L 25/0206 370/252 |
| 8,977,751 B2 | 3/2015 | Bao et al. | |
| 9,131,408 B1 | 9/2015 | Falsafi | |
| 9,756,524 B2 * | 9/2017 | Lim | H04L 47/26 |

(Continued)

OTHER PUBLICATIONS

Alfoudi et al., "Traffic Management in LTE-Wifi Slicing Networks", Loughborough University Institutional Repository, 2017, 7 pages.

*Primary Examiner* — Chi H Pham
*Assistant Examiner* — Weibin Huang
(74) *Attorney, Agent, or Firm* — Kilpatrick Townsend & Stockton LLP

(57) ABSTRACT

A mobile communications system includes a transceiver and a packet subsystem server of a mobile communications network for the transceiver. The transceiver can transceive wireless signals with mobile devices in a coverage area using wireless connections to exchange data with application servers. For each wireless connection the packet subsystem server can determine weighted scores using different weights for each of direct radio measures, a packet retransmission rate of the mobile communications network, and a throughput data rate. The packet subsystem server can determine an aggregated score from the weighted scores and determine a data-rate-control decision for the wireless connection using the aggregated score. The data-rate-control decision can be outputted to a packet core handling system of the mobile communications network for controlling the data rate of data transmitted using the wireless connection.

20 Claims, 3 Drawing Sheets

(56) References Cited

U.S. PATENT DOCUMENTS

| | | | |
|---|---|---|---|
| 2006/0203765 A1* | 9/2006 | Laroia | H04W 28/22 370/328 |
| 2007/0116139 A1* | 5/2007 | Subramanian | H04L 5/023 375/260 |
| 2007/0230395 A1* | 10/2007 | Guo | H04L 12/18 370/329 |
| 2010/0248763 A1* | 9/2010 | Aaron | H04W 28/22 455/509 |
| 2012/0198046 A1 | 8/2012 | Shah et al. | |
| 2012/0263036 A1 | 10/2012 | Barclay et al. | |
| 2013/0128744 A1 | 5/2013 | Landais et al. | |
| 2014/0101292 A1 | 4/2014 | Eriksson et al. | |
| 2015/0080009 A1* | 3/2015 | Meredith | H04W 28/0226 455/453 |
| 2015/0245250 A1 | 8/2015 | Bhattacharjee et al. | |
| 2016/0057667 A1 | 2/2016 | Rao et al. | |
| 2016/0142941 A1* | 5/2016 | Ganesh | H04W 28/20 455/41.2 |
| 2017/0230779 A1 | 8/2017 | Wang et al. | |
| 2017/0325120 A1 | 11/2017 | Szilagyi et al. | |

\* cited by examiner

MOBILE PACKET DATA RATE CONTROL BASED ON RADIO LOAD AND OTHER MEASURES

TECHNICAL FIELD

This disclosure relates generally to the field of mobile network data throughput, and more specifically relates to managing data traffic for overloaded radios of base transceiver stations.

BACKGROUND

Operators of mobile communications networks can provide voice service and data service, including service to users of mobile telephones or mobile computing devices. Voice and data service may be provided by a transceiver, such as a radio access node (also "radio," "node," or "RAN"), to provide coverage for an area of the mobile communications network. The radio provides service to users of the mobile communications network, such as to a geographical region or to a portion of the user population. Users may travel in and out of the coverage area of the radio while using mobile devices, and users may choose to access different services via the radio. These circumstances may lead to constantly changing demands (also, "load") on the radio's capacity.

Users of mobile devices may expect to have a high level of service regardless of a radio's capacity or pattern of peak demand. One technique to provide a high level of service is to increase the number of radios capable of providing service. But, factors such as geographical features or regulatory requirements may prevent network operators from installing additional radios in certain areas. In addition, adding and installing additional radios may be costly.

For example, users of mobile communications networks often choose to consume data using their mobile communications devices. The mobile device may connect to a radio and consume (e.g., download or upload) data in the form of websites, music, videos, e-books, game information, or any other suitable data types. Different types of data transfer can include exchanging different amounts of data, and may consume a different portion of the capacity of the radio. A user that is watching a video may consume a larger portion of a radio's data bandwidth as compared to a user that is sending an email.

SUMMARY

In one example, a system includes a transceiver and a packet subsystem server of a mobile communications network for the transceiver. The transceiver is configured to transceive wireless signals with a plurality of mobile devices in a coverage area using a plurality of wireless connections. The wireless signals include data from application servers. The packet subsystem server is configured to, for each wireless connection of the plurality of wireless connections, determine weighted scores using different weights for each of direct radio measures, a packet retransmission rate of the mobile communications network, and a throughput data rate. The packet subsystem server is also configured to, for each wireless connection, determine an aggregated score from the weighted scores. The packet subsystem server is also configured to, for each wireless connection, determine a data-rate-control decision for the wireless connection using the aggregated score. The packet subsystem server is also configured to, for each wireless connection, output the data-rate-control decision to a packet core handling system of the mobile communications network for controlling the data rate of data transmitted using the wireless connection.

In another example, a method includes in response to determining that a transceiver of a base transceiver station is overloaded in transceiving wireless signals with a plurality of mobile devices in a coverage area using a plurality of wireless connections, the wireless signals including data from application servers, determining weighted scores using different weights for direct radio measures, a packet retransmission rate of a mobile communications network for the base transceiver station, and a throughput data rate for a wireless connection of the plurality of wireless connections. The method also includes determining an aggregated score from the weighted scores. The method also includes determining a data-rate-control decision for the wireless connection of the plurality using the aggregated score. The method also includes outputting the data-rate-control decision to a packet core handling system of the mobile communications network for controlling the data rate of data transmitted using the wireless connection.

In another example, a packet subsystem server for a mobile communications network includes a processor device and a non-transitory computer-readable medium. The non-transitory computer-readable medium has instructions stored thereon that are executable by the processor device to cause the packet subsystem server to perform operations. The operations include in response to determining that a transceiver of a base transceiver station is overloaded in transceiving wireless signals with a plurality of mobile devices in a coverage area using a plurality of wireless connections, the wireless signals including data from application servers, determining weighted scores using different weights for direct radio measures, a packet retransmission rate of a mobile communications network for the base transceiver station, and a throughput data rate for a wireless connection of the plurality of wireless connections. The operations also include determining an aggregated score from the weighted scores. The operations also include determining a data-rate-control decision for the wireless connection of the plurality using the aggregated score. The operations also include outputting the data-rate-control decision to a packet core handling system of the mobile communications network for controlling the data rate of data transmitted using the wireless connection.

These illustrative examples are mentioned not to limit or define the disclosure, but to provide examples to aid understanding thereof. Additional embodiments are discussed in the Detailed Description, and further description is provided there

DETAILED DESCRIPTION

Figure 1:
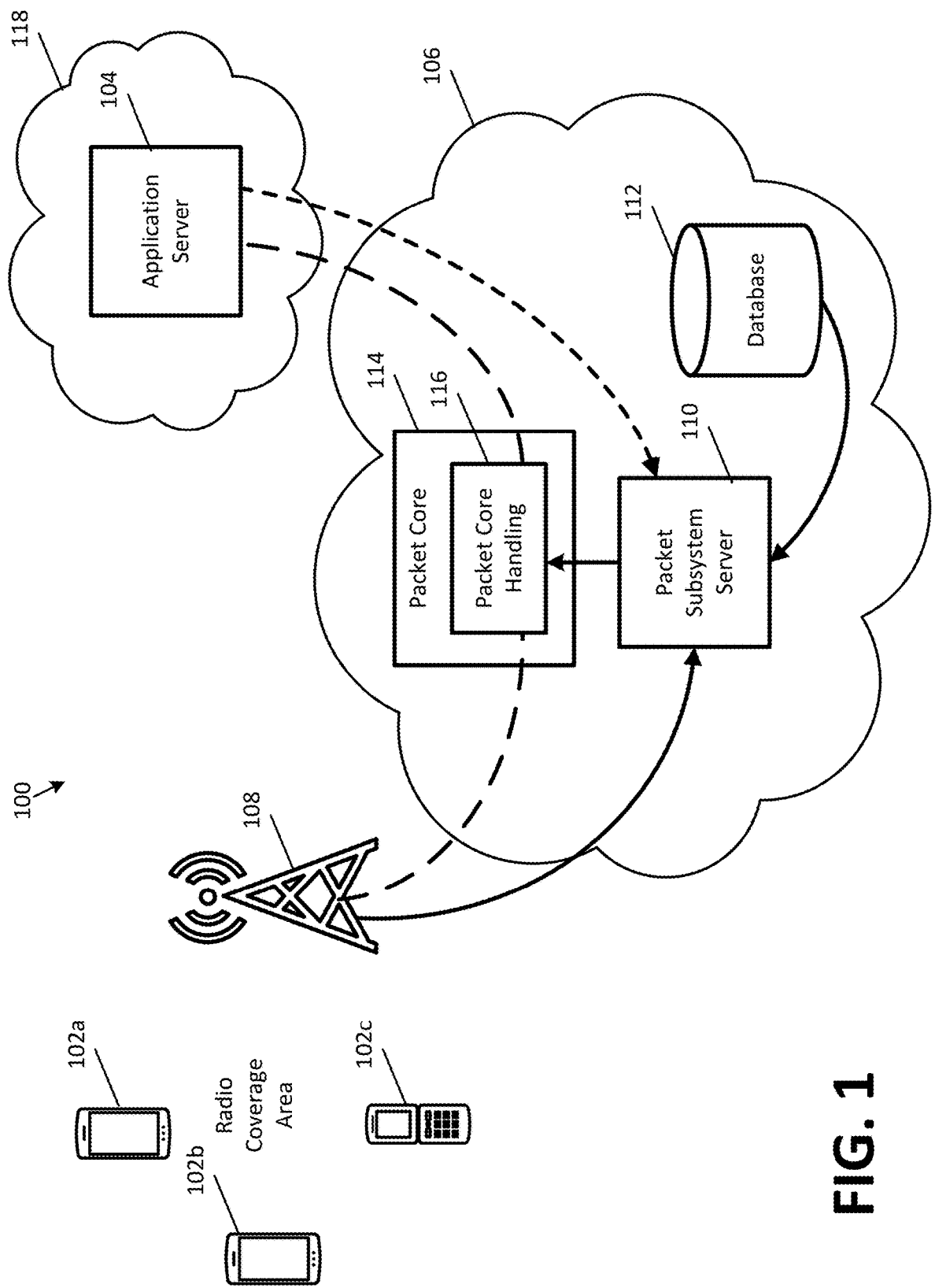
FIG. 1 is schematic of a wireless communication environment in which data can be exchanged between mobile devices and an application server using a mobile communications network according to one example of the present disclosure.

Certain aspects and features relate to controlling data rates of data being transmitted through a mobile device network and wirelessly transmitted by one or more transceivers (i.e., radios) to mobile devices in a radio coverage area. Using certain aspects can help alleviate overloaded transceivers while still providing wireless coverage to the mobile devices. In some examples, throughput data rates, packet retransmission rates, and direct radio measures can be scored for each wireless connection using different rates in response to detecting a transceiver or radio overload. The aggregated score can be used to determine if and how much to reduce data speed for the wireless connection through the mobile device network. This can reduce the load on the transceiver without requiring an additional transceiver to be added to the mobile communications network.

Base-station radio-load measures can be used to make decisions about delaying packets from mobile devices using heavily loaded base station radios. For these heavily loaded base station radios, packet delivery delays can be used to slow down data throughput rate, reducing peak loads and reducing the triggering of radio growth (e.g., to provide more capacity). The determination that a radio is heavily loaded can be performed using the count of physical resource blocks (PRBs) being used on a radio. An issue is that a single physical resource block is capable of supporting widely varying amounts of data, depending on the signal-to-noise ratio. Two mobile devices, consuming PRBs at the same rate, may have very different data throughput. Another issue is that adaptive bit-rate video can change its bit rate in accordance with bit-error-rate or frame-error-rate in the transferred content. For those mobile devices at the "edge of coverage" (e.g., those mobile devices having a low signal-to-noise ratio), the effective bandwidth of the communication channel is narrowed (through spread spectrum coding scheme) to reduce noise, but this can also reduce available bandwidth, sometimes to the point where video can no longer be supported with a usable customer experience. If a heavily loaded base station radio is identified and packet delays are inserted for all packets or perhaps for all video packets, then there is a risk of pushing the mobile devices at the edge of performance to the point of failure. Even a degradation of packet session failures of a few percent may be enough to cause a mobile carrier to turn off the data speed control feature.

To address these and other issues, the base station radio load measures indicating which mobile devices using those radios are at the edge of performance can be used. Direct radio measures can be directly accessible to the base station radio. Examples of direct radio measures can include timing advance, bi-directional bit error rate (BER) (e.g., as a proxy for signal-to-noise ratio) and frame error rate (FER). Another measure, available on layer-2 nodes closer to the packet core, is the bi-directional packet retransmission rate. This other measure at an even higher hierarchy level in the communications stack can be the actual bit rate setting. This measure may be less available than direct radio measures, since it may be within an encrypted communication, but it can still be exposed to lower layers in the communication stack for the purpose of improved data rate control performance. Exposure can come from either the client (e.g., mobile software application) or the server end of the encrypted communication.

The data rate control process can begin when a subsystem that measures the PRBs utilized on a base station radio, determines a loading threshold has been exceeded. The mobile devices contributing to that base station load can be known and the system can inspect available measures for each wireless connection to each mobile device to determine if applying data rate control is appropriate. For example, if the measures indicate that a mobile device is transacting video content or perhaps other content that uses very low latency (such as gaming), then the data rate indicated for that mobile device can be maintained, potentially without any data rate control. A direct measure can include the video application directly advising the data rate control sub-system about the current, bi-directional bit rate in use for the mobile device. Not all applications use the same bit rate. Each application, domain, or service type can have target and minimum bit rate values. The current bit rate measure can be compared with the target bit rate value or the minimum bit rate value. For example, a video-streaming service may offer a tiered video service where the customer pays for better quality video. The video-streaming service can inform the data rate control sub-system about where the current bit rate is relative to the target bit rate.

Another indicator is packet re-transmission rate, which can be impacted by packet collisions at various points in the packet communication path. This measure can be scored using a weight to determine a weighted score. BER and FER statistics can indicate the current performance of communications at the radio-frequency layer, and indirectly indicate the content being transferred. For example, FER may be measured at 1% FER and BER measured at 5% on a mobile download and the mobile can be identified as a candidate for data rate control. If the sub-system enters packet delays, there may be direct impact on FER or BER, but the performance at layer-2 in terms of megabits per second of file transfer can be inferred. And given the current bandwidth of the channel being used and the given FER and BER measures, the highest expected throughput may be 2 Mbps. The sub-system can determine whether this throughput can be reduced and by how much based on the domain, application, or service being used for the download. Each measure is provided a weight for a score computation and the lower the quality score, the less data rate control would be indicated for that mobile device. Potentially, no data rate reduction may be indicated after scoring.

In some examples, a base transceiver station includes one or more radios and can communicate via a mobile communications network to one or more application servers that exchange data with mobile devices using the mobile communications network. The mobile communications network can include a packet subsystem server, a database, and a packet core that includes a packet core handling subsystem. The packet subsystem server can collect different measures about each wireless connection to each mobile device, score those measures using weights, and determine whether and how much to reduce the data rate for each wireless connection. A wireless connection may be a communication link between the mobile device and a radio of the base transceiver station with which data is being exchanged with the mobile device. More than one wireless connection may be established for a mobile device to communicate different types of data at the same time. By identifying wireless connections that are good candidates for reducing data rates using the scored values, loads on the radios can be reduced.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is schematic of a wireless communication environment 100 in which data can be exchanged between mobile devices 102a-c and an application server 104 using a mobile communications network 106 according to one example of the present disclosure. Also included in the wireless communication environment 100 is a base transceiver station 108 that can include one or more radios (i.e., transceivers) for wirelessly communicating with mobile devices 102a-c. The mobile communications network 106 includes a packet subsystem server 110, a database 112, and a packet core 114 that includes a packet core handling subsystem 116. Although depicted as separate systems in FIG. 1, a packet subsystem server according to other examples can include the database 112.

The application server 104 may be part of a network 118, such as the Internet, and can exchange data with one or more of the mobile devices 102a-c using the mobile communications network 106 and the base transceiver station 108. The transmitted data may include packets associated with high-volume data transactions (e.g., high-bandwidth packets) or packets associated with low-volume data transactions (e.g., low-bandwidth packets). Packets may be transmitted to and from the mobile devices 102a-c via the mobile communications network 106 and radios of the base transceiver station 108. The packets may have an associated data type or media type. For example, the high-bandwidth data packet may have a media type associated with high-bandwidth data, such as video or audio media files. The low-bandwidth data packet may have a media type associated with low-bandwidth data, such as email, photo, or text media files. The media type of a particular data packet may be determined based on metadata associated with the packet (e.g., scanning a data type header of the packet).

The packet subsystem server 110 can collect measures, score them, and determine whether to modify a data rate for one or more wireless connections between the base transceiver station 108 and one or more of the mobile devices 102a-c. The measures can include direct radio measures from one or more of the transceivers of the base transceiver station 108, packet retransmission rate from the packet core 114, and application server-related information from the application server 104, mobile devices 102a-c, the database 112, or a combination of these or other sources.

The direct radio measures can include information from each of the mobile devices 102a-c, such as signal strength, signal quality, BER, FER, and timing advances, which may be function of the distance between the base transceiver station 108 and the particular mobile device so that packets arrive at the base transceiver station 108 in an orderly fashion. In some examples, the transceivers of the base transceiver station 108 can provide the direct radio measures as a feed of information to a node of a mobility management entity (MME) that is remotely located from the base transceiver station 108. The MME node can have an application programming interface that provides the direct radio measures to the packet subsystem server 110, which may be located proximate to the MME (e.g., at a regional data center or a national data center).

The packet core 114 can measure the packet retransmission rate for a wireless connection, which can represent a portion of the overall latency of transmitting data between the application server 104 and the mobile devices 102a-c.

The application server-related information can include data throughput rate of the data being exchanged between a mobile device and the application server 104, target throughput rate for the data, packet loss data, and latency between the application server 104 and the mobile device with which the application server 104 is exchanging information. The database 112 can store information about the target bit rate levels (based on historical data) for various types of applications and domain usage types. In some examples, the packet subsystem server 110 can receive information identifying the type of application or domain being used by one of the mobile devices 102a-c to communicate with the application server 104 and use the identification to determine the target bit rate level from the database 112.

The packet subsystem server 110 can score the different types of measures using weights, aggregate the scored measures, and use the aggregated score to determine whether and how much to reduce a data rate for data transmitted between the application server 104 and a mobile device via a wireless connection. For example, in response to determining that a data rate for a wireless connection should be reduced, the packet subsystem server 110 can output an instruction to the packet core handling subsystem 116 that identifies the wireless connection for a reduced data rate and, optionally, and amount by which to reduce the data rate. In response to receiving the instruction, the packet core handling subsystem 116 can insert a time delay before one or more packets that include data being exchanged. For example, the packet core handling subsystem 116 may insert a time delay in time prior to a packet before transmitting the packet to a radio of the base transceiver station 108. The time delay may control the data rate of the data stream such that the radio transmits the packet after the time delay has elapsed. The amount of reduced data rate can be based on the length of the time delay or the number of time delays inserted prior to packets in the data stream.

Figure 2:
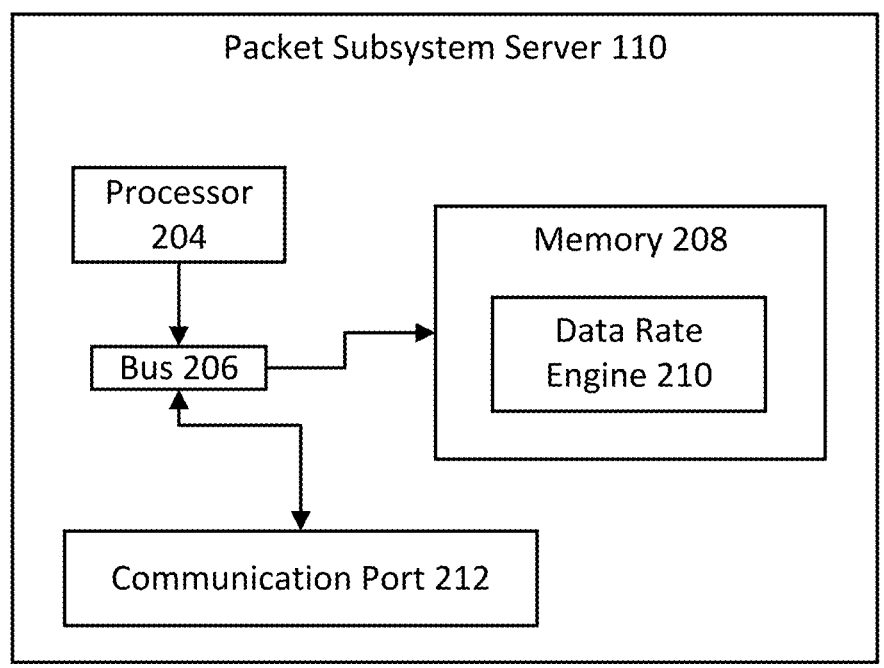
FIG. 2 is a block diagram of a packet subsystem server for a mobile communications network according to one example of the present disclosure.

FIG. 2 is a block diagram of the packet subsystem server 110 for the mobile communications network 106 according to one example of the present disclosure. The packet subsystem server 110 can include a processor 204, a memory 208, a bus 206, and a communication port 212. In some examples, some or all of the components shown in FIG. 2 can be integrated into a single structure, such as a single housing. In other examples, some or all of the components shown in FIG. 2 can be distributed (e.g., in separate housings) and in electrical communication with each other.

The processor 204 can execute one or more operations for collecting measures, scoring them, and determining a data rate control decision to output. The processor 204 can execute instructions stored in the memory 208 to perform the operations. An example of the instructions is a data rate scoring engine 210 that can be used to score collected measures and determine a data rate control decision. Measures can be collected via the communication port 212 that can provide an interface to a network. The decision can be outputted from the communication port 212 for implementation by a packet core handling sub-system. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 208 via the bus 206. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

Figure 3:
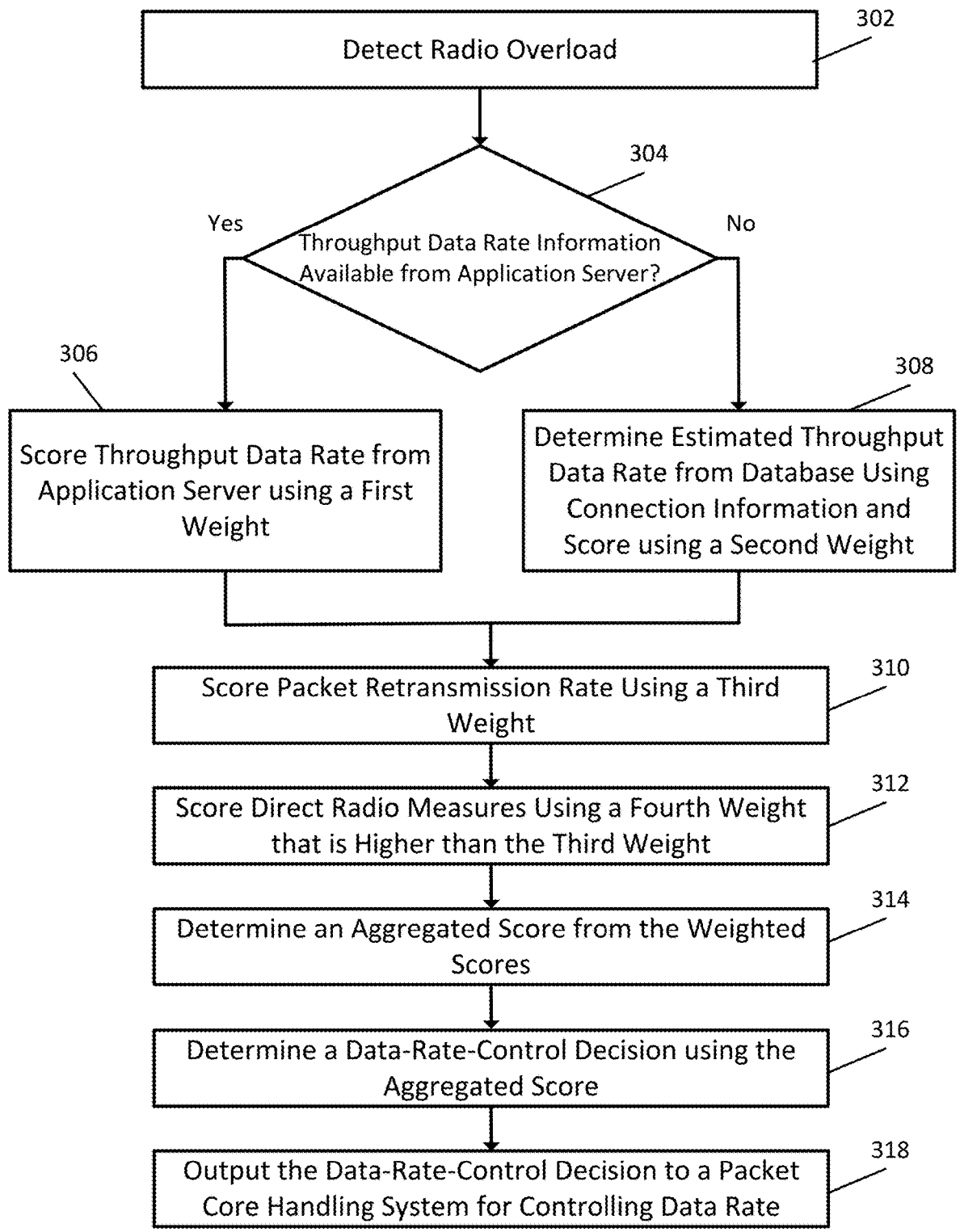
FIG. 3 is a flow chart of a process for controlling data rates of data transferred using a mobile communications network that has an overloaded transceiver according to one example of the present disclosure.

FIG. 3 is a flow chart of a process for controlling data rates of data transferred using a mobile communications network according to one example of the present disclosure. Although the process is described as being performed by a packet subsystem server, one or more other components of a mobile communications network can before part or all of the process described with respect to FIG. 3.

In block 302, a packet subsystem server can detect a radio overload. For example, the packet subsystem server can receive an indication from the MME that one or more transceivers of an associated base transceiver station is overloaded. In other examples, the packet subsystem server can collect information about the transceivers and determine that one or more of the transceivers is overloaded.

An overloaded radio can be detected using any suitable process. In some examples, a load (e.g., an amount of data carried) for a radio can be determined during a time period. The load may be associated with a specific time or date attribute (e.g., a load for the five-minute time period ending at 10:45:00 on a particular date). The load may be correlated with additional information, such as additional loads for additional time periods. Based on the correlation, an average load level can be calculated for the radio. For example, the current load may be correlated with additional loads having related time/date attributes, and a periodic average load may be calculated for the radio (e.g., hourly average load, daily average load at 9:00 AM, annual average load at 7:00 PM on a particular holiday). A load threshold may be determined for a radio. The load threshold may be determined based on the radio's load, capacity, or other suitable attributes. In addition, the load threshold may be determined based on a performance of the radio, such as the radio's performance when carrying a large volume of data. Performance of the radio may be determined based on errors reported by mobile devices, repeated data requests, transmission failures, or any other suitable metric. The current load can be compared to the load threshold and, if the load threshold is exceeded, can be identified as an overloaded radio.

The remainder of the process can be performed for each wireless connection for each mobile device handled by the overloaded radio.

In block 304, the packet subsystem server determines whether throughput data rate information is available from the application server. The data being exchanged between the mobile device and the application server may be encrypted. In some examples, throughput data rate information about the exchanged data is available directly from the application server. For example, throughput data rate information may be included as part of a header of a packet of data in which the data itself is encrypted, but the header information is not. In other examples, throughput data rate information is not available directly from the application server.

In response to determining that throughput data rate information is available from the application server, the packet subsystem server scores the throughput data information from the application server using a first weight in block 306. Scoring the throughput data rate information from the application server can include comparing the throughput data rate information, which may be the target throughput data rate information for the service or data, to a look-up table with values that correspond to different ranges of throughput data rates and output the value corresponding to the throughput data rate information. The value can then be weighted by multiplying the value with the weight. Examples of the weight include a percentage or decimal value. If throughput data rate information is available directly from the application server, then the packet subsystem server may forgo using information from a database to estimate or infer the throughput data rate information for the data or service being exchanged between the application server and the mobile device.

But in response to determining that throughput data rate information is not available directly from the application server, the packet subsystem server determines an estimated throughput data rate from a database using connection information, and scores the estimated throughput data rate using a second weight in block 308. For example, the packet subsystem server can detect the domain, application type, or service with which data is being exchanged between the mobile device and the application server. Based on the domain, application type, or service, the packet subsystem server can access information in the database that contains known historical information about typical throughput data rates for the domain, application type, or service detected. The typical throughput data rate can be used as the estimated throughput data rate for the data being exchanged. And, the estimated throughput data rate can be in a range that corresponds to a value that is scored using the second weight by multiplying the value with the second weight. In some examples, the first weight and the second weight may be the same weight amount.

In block 310, the packet subsystem server scores packet retransmission rate information using a third weight. The packet retransmission rate information may be received from the packet core and represent a portion of the latency in the connection between the mobile device and the application server. That is, the packet retransmission rate can represent the rate at which the mobile communications network and the base transceiver station retransmit, on average, packets received from the application server to the mobile device. The packet retransmission rate can be a value that, in some examples, can correspond on a look-up table to a value that is multiplied by the third weight. In some examples, the third weight is an amount that is lower than each of the first weight and the second weight.

In block 312, the packet subsystem server scores direct radio measures using a fourth weight that is higher than the third weight. Direct radio measures can be received from the overloaded radio of the base transceiver station and can include timing advances, BER, and FER. The packet subsystem server can use a look-up table to determine a value associated with the direct radio measures amount received from the radio and score that value by multiplying it with the fourth weight. In addition to being higher than the third weight the fourth weight may, in some examples, be lower than the first weight or each of the first weight and the second weight.

The weights that are used may add up to 100% in some examples. So, if the first weight, third weight, and fourth weight are used, the values of the three weights can add up to 100%. If a particular type of information is not available, then the weights for the information that is available can be adjusted so that the weights used add up to 100%. For example, if packet retransmission rate is not available for some reason but throughput data rate from the application server is available, then the first weight and the fourth weight can be used and the two weights can be adjusted such that the weights add up to 100%.

In block 314, the packet subsystem server determines an aggregated score from the weighted scores by adding the scored values that are available. The aggregated score may also be referred to as a composite score.

In block 316, the packet subsystem server determines a data-rate-control decision using the aggregated score. The data-rate-control decisions can be pre-set and can be highly customizable. For example, the system can be configured such that a particular aggregated score can be associated with a particular decision. In other examples, the packet subsystem server can include machine-learning functions that can dynamically modify the decisions and correlated aggregated scores to provide high quality wireless connection service while avoiding radio overloads. Examples of the decision include reduce data rate, reduce data rate by a specified amount, maintain data rate, and increase data rate. The specified amount may, in some examples, be a continuum such that lower scores have a higher amount of data rate reduction. The decision can be for a particular wireless connection.

In block 318, the packet subsystem server outputs the data-rate-control decision to the packet core handling system for controlling the data rate for the particular wireless connection. The packet core handling system can control the data rate by, for example, inserting packet delays in a manner described previously.

The process of FIG. 3 can be repeated for each wireless connection handled by the overloaded radio or until the overloaded radio is no longer overloaded.

The implementations described herein are examples, and the features of different implementations may be combined to achieve many different techniques, without departing from the described implementations. For all of the provided examples and figures, the values and ranges are examples only, and may be changed without departing from the scope of the disclosure.

The foregoing descriptions and examples are provided for purposes of illustrating, explaining, and describing aspects of the present disclosure. Further modifications and adaptations to these examples will be apparent to those skilled in the art and may be made without departing from the scope of the disclosure. The systems and methods represented here may be implemented independently, in conjunction with a different one of the systems described, or in conjunction with a system not described herein.

What is claimed is:

1. A system comprising:
   a transceiver configured to transceive wireless signals with a plurality of mobile devices in a coverage area using a plurality of wireless connections, the wireless signals including data from application servers;
   a packet subsystem server of a mobile communications network for the transceiver, the packet subsystem server being configured to, for each wireless connection of the plurality of wireless connections:
      determine weighted scores using different weights for each of direct radio measures, a packet retransmission rate of the mobile communications network, and a throughput data rate;
      determine an aggregated score from the weighted scores;
      determine a data-rate-control decision for the wireless connection using the aggregated score; and
      output the data-rate-control decision to a packet core handling system of the mobile communications network for controlling the data rate of data transmitted using the wireless connection.

2. The system of claim 1, wherein the packet subsystem server is configured to determine the weighted scores using different weights for each of the direct radio measures, the packet retransmission rate of the mobile communications network, and the throughput data rate by:
   determining whether the throughput data rate is available from an application server providing data that is transmitted using the wireless connection;
   in response to determining that the throughput data rate is available from the application server, determining a first score for the throughput data rate using a first weight;
   in response to determining that the throughput data rate is not available from the application server, (i) comparing packet connection information for the wireless connection to a target throughput data rate and (2) determining a second score for the comparison using a second weight;
   determining a third score for the packet retransmission rate of the mobile communications network using a third weight; and
   determining a fourth score for the direct radio measures from the transceiver using a fourth weight that is higher than the third weight.

3. The system of claim 2, wherein the fourth weight is lower than each of the first weight and the second weight.

4. The system of claim 2, wherein the direct radio measures include timing advance for the wireless connection, bit error rate, and frame error rate.

5. The system of claim 2, wherein the packet subsystem server is configured to determine the target throughput data rate from information from the mobile device, the application server, or stored data, or by inferring the target throughput data rate from a type of service of data being transferred, a domain of a source of the data, or a name of an application receiving the data on the mobile device.

6. The system of 2, wherein the packet subsystem server is configured to receive the packet retransmission rate from a packet core that includes the packet core handling system.

7. The system of claim 1, wherein the packet subsystem server is configured to determine the data-rate-control decision for the wireless connection only in response to determining that the transceiver is overloaded.

8. The system of claim 1, further comprising:
   the packet core handling system that is configured to respond to the data rate control decision by reducing the data rate of the data transmitted using the wireless connection.

9. A method comprising:
   in response to determining that a transceiver of a base transceiver station is overloaded in transceiving wireless signals with a plurality of mobile devices in a coverage area using a plurality of wireless connections, the wireless signals including data from application servers:
      determining weighted scores using different weights for direct radio measures, a packet retransmission rate of a mobile communications network for the base transceiver station, and a throughput data rate for a wireless connection of the plurality of wireless connections;

determining an aggregated score from the weighted scores;

determining a data-rate-control decision for the wireless connection of the plurality using the aggregated score; and outputting the data-rate-control decision to a packet core handling system of the mobile communications network for controlling the data rate of data transmitted using the wireless connection.

10. The method of claim 9, wherein determining the weighted scores using different weights for the direct radio measures, the packet retransmission rate of the mobile communications network, and the throughput data rate comprises:

determining whether the throughput data rate is available from an application server providing data that is transmitted using the wireless connection;

in response to determining that the throughput data rate is available from the application server, determining a first score for the throughput data rate using a first weight;

in response to determining that the throughput data rate is not available from the application server, (i) comparing packet connection information for the wireless connection to a target throughput data rate and (2) determining a second score for the comparison using a second weight;

determining a third score for the packet retransmission rate of the mobile communications network using a third weight; and determining a fourth score for the direct radio measures from the transceiver using a fourth weight that is higher than the third weight.

11. The method of claim 10, wherein the fourth weight is lower than each of the first weight and the second weight.

12. The method of claim 10, wherein the direct radio measures include timing advance for the wireless connection, bit error rate, and frame error rate.

13. The method of claim 10, further comprising determining the target throughput data rate from information from the mobile device, the application server, or stored data, or by inferring the target throughput data rate from a type of service of data being transferred, a domain of a source of the data, or a name of an application receiving the data on the mobile device.

14. The method of claim 10, further comprising receiving the packet retransmission rate from a packet core that includes the packet core handling system.

15. A packet subsystem server for a mobile communications network, the packet subsystem server comprising:

a processor device; and a non-transitory computer-readable medium having instructions stored thereon that are executable by the processor device to cause the packet subsystem server to perform operations, the operations comprising:

in response to determining that a transceiver of a base transceiver station is overloaded in transceiving wireless signals with a plurality of mobile devices in a coverage area using a plurality of wireless connections, the wireless signals including data from application servers:

determining weighted scores using different weights for direct radio measures, a packet retransmission rate of a mobile communications network for the base transceiver station, and a throughput data rate for a wireless connection of the plurality of wireless connections;

determining an aggregated score from the weighted scores;

determining a data-rate-control decision for the wireless connection of the plurality using the aggregated score; and outputting the data-rate-control decision to a packet core handling system of the mobile communications network for controlling the data rate of data transmitted using the wireless connection.

16. The packet subsystem server of claim 15, wherein the operation of determining the weighted scores using different weights for the direct radio measures, the packet retransmission rate of the mobile communications network, and the throughput data rate comprises:

determining whether the throughput data rate is available from an application server providing data that is transmitted using the wireless connection;

in response to determining that the throughput data rate is available from the application server, determining a first score for the throughput data rate using a first weight;

in response to determining that the throughput data rate is not available from the application server, (i) comparing packet connection information for the wireless connection to a target throughput data rate and (2) determining a second score for the comparison using a second weight;

determining a third score for the packet retransmission rate of the mobile communications network using a third weight; and determining a fourth score for the direct radio measures from the transceiver using a fourth weight that is higher than the third weight.

17. The packet subsystem server of claim 16, wherein the fourth weight is lower than each of the first weight and the second weight.

18. The packet subsystem server of claim 16, wherein the direct radio measures include timing advance for the wireless connection, bit error rate, and frame error rate.

19. The packet subsystem server of claim 16, wherein the operations further comprise determining the target throughput data rate from information from the mobile device, the application server, or stored data, or by inferring the target throughput data rate from a type of service of data being transferred, a domain of a source of the data, or a name of an application receiving the data on the mobile device.

20. The packet subsystem server of claim 16, wherein the operations further comprise receiving the packet retransmission rate from a packet core that includes the packet core handling system.

* * * * *